United States Patent [19]

Hoyle

[11] 3,917,604
[45] Nov. 4, 1975

[54] PREPARATION OF DISPERSE METHINE DYE COMPOUNDS

[75] Inventor: Vinton A. Hoyle, Kingsport, Tenn.

[73] Assignee: Eastman Kodak Company, Rochester, N.Y.

[22] Filed: Mar. 14, 1973

[21] Appl. No.: 341,218

[52] U.S. Cl. .... 260/283 CN; 260/240 R; 260/240 J; 260/244 R; 260/283 SY; 260/283 BI; 260/287 D; 260/288 CE; 260/465 E; 260/568; 260/574; 260/575; 260/577; 260/578; 260/590

[51] Int. Cl.² .................................... C07D 215/18

[58] Field of Search ... 260/283 CN, 283 SY, 244 R, 260/240 R, 240 J

[56] References Cited
UNITED STATES PATENTS

| | | | |
|---|---|---|---|
| 3,240,783 | 3/1966 | Straley et al. | 260/283 CN |
| 3,398,152 | 8/1968 | Wallace et al. | 260/283 CN |
| 3,453,270 | 7/1969 | Weaver et al. | 260/244 R |
| 3,453,280 | 7/1969 | Weaver et al. | 260/283 CN |
| 3,595,863 | 7/1971 | Coates et al. | 260/283 CN |
| 3,855,215 | 12/1974 | Fisher et al. | 260/244 R |

*Primary Examiner*—R. Gallagher
*Assistant Examiner*—Mary C. Vaughn

[57] ABSTRACT

Process for the preparation of a disperse methine dye compound having the formula

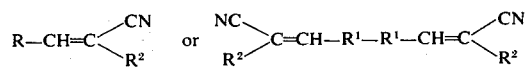

which comprises contacting a preformed anhydrous solution of an intermediate compound, formed by contacting an amine having the formula H—R or H—R¹—R¹—H with POCl₃ and a di-lower alkylformamide, with an active methylene compound having the formula NC—CH₂—R², preferably in the presence of an acid acceptor, wherein R is a monovalent and R¹ is a divalent residue of an aniline, 1,2,3,4-tetrahydroquinoline or benzomorpholine component of a disperse methine dye compound attached to the group —CH=C(CN)R² by an aromatic carbon atom in the position para to the nitrogen atom of the aniline, tetrahydroquinoline and benzomorpholine nucleus; and R² is cyano, lower alkoxycarbonyl, lower alkanoyl, aroyl, lower alkylsulfonyl, arysulfonyl, carbamoyl, N-lower-alkylcarbamoyl or N,N-di-lower-alkylcarbamoyl.

15 Claims, No Drawings

PREPARATION OF DISPERSE METHINE DYE COMPOUNDS

This invention relates to a novel process for making methine compounds, also described as styryl compounds, useful as disperse dyes for dyeing synthetic fibers such as cellulose acetate and polyester fibers.

According to known techniques, methine compounds, such as Colour Index Disperse Yellows 88 and 89, are prepared by treating an aromatic amine with an N,N-dialkylformamide and a dehydrating agent such as $POCl_3$ followed by drowning in water to obtain a formylated aromatic amine and then condensing the formyl compound with an active methylene compound in the presence of a basic catalyst. Such techniques are described extensively in the patent literature, e.g., U.S. Pat. No. 3,398,152. Since the reaction of the active methylene compound and the formyl compound generally requires essentially anhydrous conditions, the formyl compound must be isolated and dried or extracted with an organic solvent, both of which are time consuming and therefore add considerably to the cost of the methine compound.

I have discovered that methine compounds having the formula

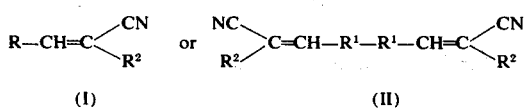

can be prepared by contacting a preformed anhydrous solution of an intermediate compound, formed by contacting an amine having the formula H-R [to obtain methine compound (I)] or the formula H—$R^1$—$R^1$—H [to obtain methine compound (II)] with $POCl_3$ and a di-lower alkylformamide, with an active methylene compound having the formula NC—$CH_2$—$R^2$. In the above formulas R is a monovalent and $R^1$ is a divalent residue of an aniline, 1,2,3,4,-tetrahydroquinoline or benzomorpholine component of a disperse methine dye compound attached to the group —CH=C(CN)$R^2$ by an aromatic ring carbon atom in the position para to the aromatic amine nitrogen atom; and $R^2$ is cyano or an acyl group derived from an organic, carboxylic or sulfonic acid.

Utilization of my novel process avoids the necessity of isolating a formyl compound as is done in known techniques applied in the synthesis of methine compounds. The process has the further advantages of not requiring a basic catalyst and avoiding exposure of the intermediate to water which, under certain conditions, can result in hydrolytic decomposition of the intermediate. Another advantage is that the intermediate compound, in general, reacts with the active methylene compound at a lower temperature than does the corresponding formyl compound.

The compounds of formulas (I) and (II) and residues —R and —$R^1$—$R^1$ are well known in the art of disperse methine dyes. The following are some of the patents disclosing such methine dyes:

| | | |
|---|---|---|
| U.S. 1,950,421 | U.S. 2,850,520 | U.S. 3,435,062 |
| U.S. 2,053,819 | U.S. 2,914,551 | U.S. 3,453,280 |
| U.S. 2,166,487 | U.S. 3,027,220 | U.S. 3,504,010 |
| U.S. 2,179,895 | U.S. 3,189,641 | U.S. 3,555,016 |
| U.S. 2,206,108 | U.S. 3,240,783 | British 1,173,679 |
| U.S. 2,583,551 | U.S. 3,247,211 | British 1,138,583 |
| U.S. 2,649,471 | U.S. 3,326,960 | British 1,138,582 |
| U.S. 2,766,233 | U.S. 3,349,098 | British 1,053,997 |
| U.S. 2,776,310 | U.S. 3,386,491 | British 1,049,315 |
| U.S. 2,789,125 | U.S. 3,390,168 | British 1,036,079 |
| U.S. 2,811,544 | U.S. 3,422,133 | Belgian 703,661 |

Additional methine dyes are disclosed in U.S. Pat. application Ser. No. 215,439 filed Jan. 4, 1972, now U.S. Pat. No. 3,728,374; and still pending but allowed Ser. No. 237,529 filed Mar. 23, 1972.

The most common of the aromatic residues represented by R and $R^1$ are aniline, 1,2,3,4-tetrahydroquinoline, and, to a lesser extent, benzomorpholine residues. Typical of such aniline and tetrahydroquinoline residues are the groups having the formulas

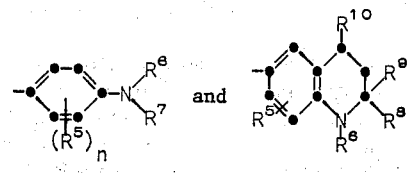

in which $R^5$ is lower alkyl, lower alkoxy or halogen; $n$ is 0, 1 or 2; $R^6$ and $R^7$ are unsubstituted or substituted alkyl containing up to about 12 carbon atoms; cyclohexyl; unsubstituted or substituted aryl; or when $R^7$ is phenyl $R^6$ can be hydrogen; and $R^8$, $R^9$ and $R^{10}$ are hydrogen or lower alkyl. As used herein to describe an alkyl group or a group containing an alkyl moiety, "lower" designates a carbon content of up to about 4 carbon atoms. The aryl groups referred to herein include phenyl and phenyl substituted with nonionic substituents such as lower alkyl, lower alkoxy, halogen, lower alkoxycarbonyl, cyano, carbamoyl, etc.

The $R^1$ moieties of the —$R^1$—$R^1$— residues of methine compounds (II), i.e., bis-methine compounds can be joined by a common nitrogen atom as disclosed in U.S. 3,189,641 or by various aliphatic groups which can contain within them aryl and cycloalkyl groups as disclosed in U.S. Pat. Nos. 3,386,591, 3,504,010, 3,597,434 and Belgian No. 703,661. Representative of the residues represented by —$R^1$—$R^1$— are groups conforming to the formulas

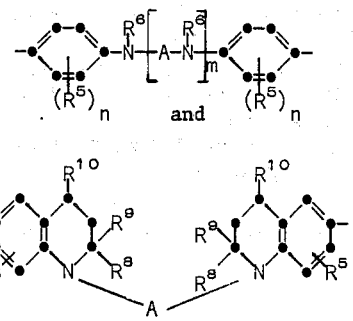

wherein each $R^5$, $R^6$, $R^8$, $R^9$ and $R^{10}$ can be the same or different groups as defined above, $m$ is 0 or 1 and A is a divalent group having the formula —$R^{11}$—B—$R^{12}$— in which $R^{11}$ and $R^{12}$ are lower alkylene groups and B is a divalent radical such as oxygen, sulfur, sulfonyl, a dicarboxylic acid ester residue, a diisocyanate residue, a dicarboxylic acid amide residue, etc. The group —$R^1$—$R^1$— also can be joined benzomorpholine groups or the $R^1$ groups can be different, e.g., an aniline residue joined to a tetrahydroquinoline residue.

Preferred groups represented by —R and —$R^1$—$R^1$— are those encompassed by the general formulas

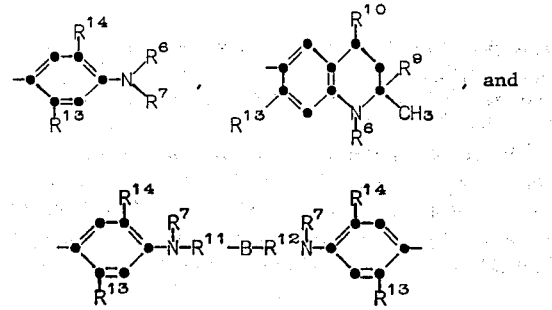

wherein $R^{13}$ is hydrogen, methyl, methoxy, ethoxy or chlorine;
$R^{14}$ is hydrogen, methyl, methoxy or ethoxy;
$R^6$ is lower alkyl; phenethyl; cyclohexylmethyl; benzyl; benzyl substituted with lower alkyl, lower alkoxy, chlorine, bromine or lower alkoxycarbonyl; aryl; or a group having the formula —$R^{11}$—$R^{15}$ in which $R^{11}$ is ethylene, propylene, trimethylene or tetramethylene and $R^{15}$ is lower alkanoyloxy, cyano, lower alkoxycarbonyloxy, arylcarbamoyloxy, lower alkylcarbamoyloxy, aroyloxy, lower alkoxycarbonylbenzoyloxy, lower alkoxy, chlorine, aryloxy, 2-benzothiazolylthio, or a group having the formula

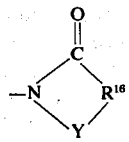

in which Y is —CO—, —$SO_2$—, or —$CH_2$— and $R^{16}$ is ethylene, propylene, trimethylene or o-arylene;

$R^7$ is lower alkyl; cyclohexyl; lower alkylcyclohexyl; benzyl; benzyl substituted with lower alkyl, lower alkoxy, chlorine or bromine; aryl; or a group having the formula —$R^{11}$—$R^{17}$ in which $R^{11}$ is ethylene, propylene, trimethylene or tetramethylene and $R^{17}$ is lower alkanoyloxy, lower alkoxycarbonyloxy, aroyloxy or lower alkoxy;

$R^9$ and $R^{10}$ each is hydrogen or methyl;
$R^{11}$ and $R^{12}$ each is ethylene, propylene, trimethylene or tetramethylene; and
B is a divalent group having the formula —Z—$R^{18}$—Z— in which Z is

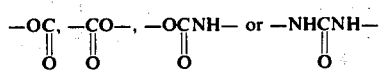

and $R^{18}$ is alkylene of one to six carbon atoms, phenylene or phenylene substituted with methyl;
in which each aryl moiety is phenyl, tolyl, lower alkoxyphenyl, or chlorophenyl.

The intermediate compounds which, in accordance with my invention, are reacted with an active methylene compound, are obtained from aromatic amines according to known techniques or procedures analogous thereto by contacting the amine with a combination of an acid chloride, such as $POCl_3$, and a di-lower-alkylformamide, such as dimethylformamide (DMF). Although only equimolar amounts of the amine, the acid chloride and the dialkylformamide are necessary, complete conversion of the amine to the intermediate compound is enhanced by using excess dialkylformamide as the solvent and a slight excess, e.g., up to 25 percent molar excess, of the acid chloride. If desired, other water-miscible solvents containing no active hydrogen, such as tri-lower alkylphosphates, diglyme, and glycol ethers can be used in combination with the dialkylformamide. As is known, the medium in which the intermediate compound is formed should be essentially anhydrous to avoid undue hydrolysis of the acid chloride. The amines used in the synthesis have the formulas R—H and H—$R^1$—$R^1$—H wherein R and —$R^1$—$R^1$— are defined hereinabove.

The intermediates used in my novel process have not been characterized by general formulas because I have not established definitely the formula for any of such intermediate compounds. Mahens, Bull. Societe Chim. de France, No. 10, 1989–1999 (1962) indicates that the formula for the intermediates used in my process are

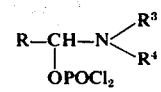

derived from amine R—H, or

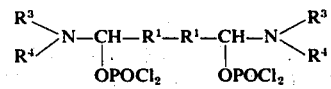

derived from amine H—$R^1$—$R^1$—H,
in which R and $R^1$ are defined above and $R^3$ and $R^4$ are lower alkyl groups derived from the di-lower alkylformamide. However, in Fieser and Fieser, Reagents for Organic Synthesis, p. 284, John Wiley & Sons, Inc. (1967) suggest that the formulas for the intermediates are

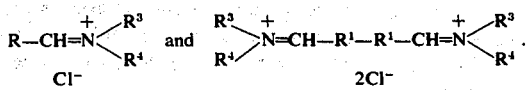

It also is possible that the above cations can be associated with the anion $PO_2Cl_2$ rather than with only the chloride ion shown. In view of the uncertainties concerning the structure of the intermediates, such intermediates are described herein and in the claims simply by means of the known technique by which they are obtained.

The solvent in which the intermediate compound is dissolved prior to reaction with the active methylene compound can be any which is inert to the reactants. Preferably, the solvent is the same as that used in the synthesis of the intermediate compound which is not isolated prior to its reaction with the active methylene compound. The utilization of auxiliary solvents such as those mentioned in the preceding paragraph will aid in the isolation of the methine compound product.

The active methylene compounds from which methine compounds are derived and having the formula NC—$CH_2R^2$ are well known. Examples of the acyl groups represented by $R^2$ include lower alkoxycarbonyl, lower alkanoyl, aroyl, lower alkylsulfonyl, arylsulfonyl, carbamoyl, N-lower alkylcarbamoyl, N,N-di-lower alkylcarbamoyl, etc. The alkoxycarbonyl groups can be substituted with various groups such as lower alkoxy, halogen, phenyl, etc. Because of the superior properties of the resulting methine dye compounds, malononitrile and the lower alkyl cyanoacetates are the preferred active methylene compounds. For the process to be economically feasible, at least one mole of active methylene compound is used per mole of intermediate compound derived from the R—H amine previously mentioned and per 0.5 mole of intermediate compound derived from the H—R$^1$—R$^1$—H amine previously mentioned. It is advantageous to use a molar excess, e.g., up to 10 mole percent or more, of the latter to insure maximum conversion of the former to methine product.

Improved yields of methine compounds are obtained from my novel process if it is carried out in the presence of an acid acceptor. Examples of such acid acceptors include alkali metal salts of lower carboxylic acids such as sodium and potassium acetate, alkali metal carbonates and bicarbonates such as sodium carbonate, potassium carbonate, sodium bicarbonate and potassium bicarbonate, alkali metal hydroxides such as sodium and potassium hydroxide and tertiary amines such as trilower alkylamines and pyridine. The amount of acid acceptor which will give the best results will vary depending on the acid acceptor used, the amount of POCl$_3$ used in synthesizing the intermediate compound and the particular aromatic amine used in preparing the intermediate compound. Although the optimum amount of acid acceptor can be readily determined experimentally, the use of at least about three to four mole equivalents of acid acceptor per mole of POCl$_3$ used in the synthesis of the intermediate compound gives superior results. For example, the use of one mole of POCl$_3$ in the synthesis of the intermediate compound will generally require, for best yields, at least 3 to 4 moles of sodium acetate or sodium bicarbonate and at least 1.5 to 2 moles of sodium carbonate. The use of more than the optimum amount of acid acceptor is not detrimental although it can add to the cost of the methine compound product. The mechanism by which the acid acceptor functions to improve the performance of my process is not fully understood.

The temperature range over which my process can be carried out is not important. Temperatures within the range of about 0° to 125°C. can be used successfully with temperatures in the range of about 10° to 80°C., especially about 20° to 80°C. being preferred. Although it is not advantageous, the process can be carried out at pressures moderately above or below atmospheric pressure.

The reaction medium of my novel process is anhydrous due to the comsumption of any trace amounts of water by the intermediate compound or by the presence of any POCl$_3$ residues present.

A preferred embodiment of the invention comprises the addition of a solution of the intermediate compound in DMF to a solution or slurry of the active methylene compound and acid acceptor in a water-miscible organic solvent. The performance of the physical steps of the process in this manner simplifies the isolation of the methine product essentially free of impurities. To isolate the product, water is added to effect complete precipitation of the product followed by filtration. Examples of the water-miscible solvents which can be used include the lower alkanols such as methanol, ethanol, propanol, and isopropanol, glycols such as ethylene glycol, propylene glycol and diethylene glycol, glycol ethers such as 2-methoxyethanol, 2-ethoxyethanol and diethylene glycol dimethyl ether, di-lower-alkylalkanoylamides such as DMF and dimethylacetamide, and tri-lower alkylphosphate such as triethylphosphate. Phosphates and possibly other by-products formed during the process precipitate as a gelatinous material in cold or room temperature water. This by-product precipitate is soluble in hot (at least 50°C.) water and thus can be removed from the product by washing it with hot water.

My novel process is further illustrated by the following examples.

EXAMPLE 1

To a solution of 175 g. of 1-(2-phenylcarbamoyloxyethyl)-2,2,4,7-tetramethyl-1,2,3,4-tetrahydroquinoline in 300 ml. DMF at 45°C. is added 88.0 g. phosphorus oxychloride and the reaction mixture is heated to 80°–85°C. and held at that temperature for one hour to complete formation of the intermediate compound. The solution of the intermediate compound is cooled to 45°C. and added over a 1-hour period to a mixture of 800 ml. isopropanol, 46.5 g. malononitrile and 186 g. sodium acetate. The mixture then is heated to 60°–65°C. and held at that temperature for 2 hours. To this mixture is added 625 ml. water over a 1-hour period while maintaining the temperature at 60°–65°C. The reaction mixture then is cooled to 30°C., held for 1 hour and the methine product is filtered off, washed with isopropanol, cold water and hot water and then dried. The assay yield of methine compound having the formula

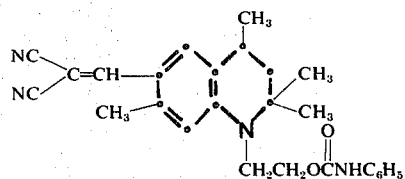

is 96.5 percent.

EXAMPLE 2

Phosphorous oxychloride (71.2 g.) is added over a 45-minute period to a solution of bis(2-[N-ethyl-m-toluidino]ethyl) adipate in 200 ml. of DMF keeping the temperature between 20°–30°C. The reaction mixture is heated to and held at 60°–65°C. for 1 hour and then cooled to 40°–45°C. The solution of intermediate compound is added to a mixture of 800 ml. isopropanol, 150 g. sodium acetate and 28 g. malononitrile and the mixture is heated at 60°–65°C. for 1 hour. The methine dye is precipitated by the addition of 335 ml. water over a 30 minute period after which the mixture is held at 25°–30°C. for 1 hour. The methine dye is filtered off, washed with isopropanol and hot water and dried. The assay yield of bis-methine dye obtained and having the formula

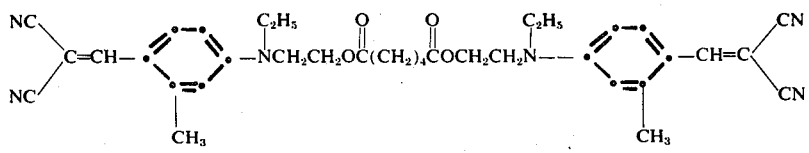

is 87 percent. The substitution of four moles of sodium bicarbonate per mole of POCl₃ in the above procedure gives an 81 percent assay yield of the bis-methine dye. A 67 percent assay yield was obtained when 4 moles triethylamine per mole POCl₃ was used.

EXAMPLE 3

To a solution of 73.5 g. triphenylamine in 225 ml. DMF at 80°C. is added dropwise 50.4 g. phosphorus oxychloride. The addition is carried out over a 30 minute period at such a rate that a temperature of 90°–92°C. is maintained. The amber solution then is heated at 90°–93°C. for 3 hours, cooled to 25°C. and drowned into a chilled mixture of 82 g. sodium acetate, 36.6 g. ethyl cyanoacetate and 300 ml. ethanol at such a rate that a temperature of 25°–30°C. is maintained. After being stirred for 30 minutes at room temperature, 450 ml. of water is added. The mixture is cooled to 0.5°C. and the product is filtered off, washed with one 1. of a 50:50 mixture of isopropanol and water and then with 500 ml. water and then dried. The assay yield of methine dye obtained and having the formula

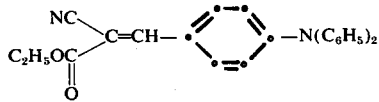

is 93 percent.

EXAMPLE 4

Phosphorus oxychloride (87.9 g.) is added over a 30-minute period to a solution of N,N-di(2-acetoxyethyl)-m-toluidine (139 g.) while maintaining the temperature at 20°–30°C. The mixture then is heated at 63°–67°C. for 1 hour, cooled to 30°C. and added to a slurry of sodium acetate (186 g.) and methyl cyanoacetate (74.3 g.) in 500 ml. isopropanol, keeping the temperature between 10°–15°C. After holding for 90 minutes at 10°–15°C., 625 ml. water is slowly added and the mixture is heated at 50°C. for 30 minutes. After cooling to 10°–15°C., the methine product is filtered off, washed with isopropanol, cold water and finally hot water (65°–75°C.). The yield of compound having the formula

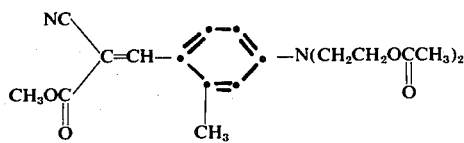

is 173.8 g.

In the preparation of the methine compound, the phosphorus oxychloride can be added to the DMF to which the aromatic amine is then added. In my novel process N-methylformanilide can be substituted for the DMF and the phosphorus oxychloride can be replaced with thionyl chloride or phosgene. However, the use of such other materials is not preferred because of economical and/or safety considerations.

The patents and applications referred to hereinabove describe additional methine disperse dye compounds which can be obtained in good yields by the procedures described in the preceding examples or minor variations thereof.

The invention has been described in detail with particular reference to certain preferred embodiments thereof, but it will be understood that variations and modifications can be effected within the spirit and scope of the invention as described hereinabove.

I claim:

1. Process for the preparation of a disperse methine dye compound having the formula

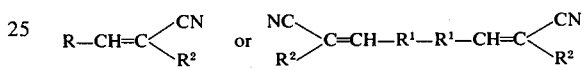

which comprises the steps of contacting in the presence of at least three mole equivalents of an acid acceptor per mole of POCl₃ a preformed anhydrous solution of an intermediate compound formed by contacting an amine having the formula H—R or —H—R¹—R¹—H with POCl₃ and a di-alkylformamide wherein the alkyl moiety is 1-4 carbons, with an active methylene compound having the formula NC—CH₂—R², wherein R is a monovalent residue of an aniline, 1,2,3,4-tetrahydroquinoline or benzomorpholine component of a disperse methine dye compound attached to the group —CH=C(CN)R² by the aromatic carbon atom para to the nitrogen atom of said aniline, tetrahydroquinoline or benzomorpholine nucleus;

R¹ is a divalent residue of an aniline or 1,2,3,4-tetrahydroquinoline component of a disperse methine dye compound attached to the group —CH=C(CN)R² by the aromatic carbon atom para to the nitrogen atom of said aniline or tetrahydroquinoline nucleus; and R² is cyano, alkoxycarbonyl of 2–5 carbons, alkanoyl of 2–5 carbons, phenyl carbonyl or phenyl carbonyl mono- or disubstituted with alkyl of 1–4 carbons, alkoxy of 1–4 carbons, Cl or Br, alkylsulfonyl of 1–4 carbons, phenylsulfonyl or phenylsulfonyl mono- or disubstituted with alkyl of 1–4 carbons, alkoxy of 1–4 carbons, Cl or Br, carboamoyl, N-alkylcarbamoyl or N,N-di-alkylcarbamoyl of 1–4 carbons in the alkyl moiety.

2. Process according to claim 1 wherein the process is carried out in the presence of an acid acceptor at a temperature of 0° to 125°C. and the aniline or tetrahydroquinoline residue of the methine dye compound has the formula

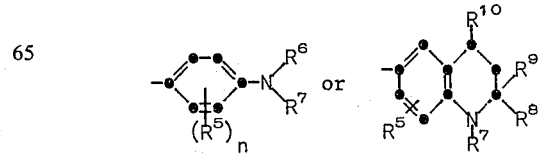

in which $R^5$ is alkyl of 1–4 carbons, or halogen; $n$ is 0, 1 or 2; $R^6$ and $R^7$ are hydrogen, alkyl of up to 12 carbon atoms, cyclohexyl, or phenyl or phenyl substituted with alkyl of 1–4 carbons, alkoxy of 1–4 carbons, chlorine or bromine; and $R^8$, $R^9$ and $R^{10}$ are hydrogen or alkyl of 1–4 carbons.

3. Process according to claim 1 wherein the process is carried out in the presence of an acid acceptor at a temperature of 0° to 125°C. and the methine compound of a —$R^1$—$R^1$— residue having the formula

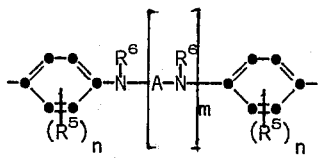

wherein $R^5$ is alkyl of 1–4 carbons, alkoxy of 1–4 carbons, or halogen; $n$ is 0, 1 or 2; $R^6$ is hydrogen, alkyl of up to 8 carbon atoms, cyclohexyl, or phenyl or phenyl substituted with alkyl of 1–4 carbons, alkoxy of 1–4 carbons, chlorine or bromine; $m$ is 0 or 1 and A is a divalent group having the formula —$R^{11}$—B—$R^{12}$— in which $R^{11}$ and $R^{12}$ are alkylene of 1–4 carbons and B is —O—, —S—, —SO$_2$—, a dicarboxylic acid ester residue, a diisocyanate residue or a dicarboxylic acid amide residue.

4. A process according to claim 1 for the preparation of a disperse methine dye compound having the formula

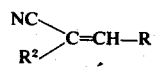

which comprises the steps of contacting at 0° to 125°C. an anhydrous solution of an intermediate compound, formed by contacting an amine having the formula H—R with POCl$_3$ and a di-alkylformamide of 1–4 carbons in the alkyl moiety, with an active methylene compound having the formula NC—CH$_2$—R$^2$ in the presence of at least three to four mole equivalents of an acid acceptor per mole of POCl$_3$ used in the synthesis of the intermediate compound, wherein R is a monovalent residue of an aniline component of a disperse methine dye compound; and $R^2$ is cyano, alkoxycarbonyl of 2–5 carbons, alkanoyl of 2–5 carbons, phenyl carbonyl or phenyl carbonyl mono- or disubstituted with alkyl of 1–4 carbons, alkoxy of 1–4 carbons, Cl or Br, alkylsulfonyl of 1–4 carbons in the alkyl moiety, phenylsulfonyl or phenylsulfonyl mono- or disubstituted with alkyl of 1–4 carbons, alkoxy of 1–4 carbons, Cl or Br, carbamoyl, N-alkylcarbamoyl or N,N-di-alkylcarbamoyl of 1–4 carbons in the alkyl moiety.

5. A process according to claim 1 for the preparation of a disperse methine dye compound having the formula

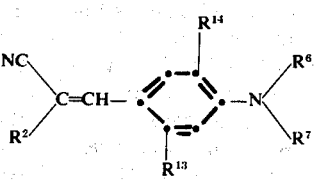

which comprises the steps of contacting at 10° to 80°C. an anhydrous solution of an intermediate compound, formed by contacting an amine having the formula

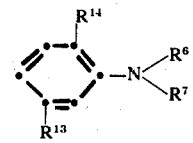

with POCl$_3$ and dimethylformamide, with an active methylene compound having the formula NC—CH$_2$—R$^2$ in the presence of at least three to four mole equivalents of an acid acceptor per mole of POCl$_3$ used in the synthesis of the intermediate compound, wherein $R^2$ is cyano or alkoxycarbonyl of 2—5 carbons;
$R^{13}$ is hydrogen, methyl, methoxy, ethoxy or chlorine;
$R^{14}$ is hydrogen, methyl, methoxy or ethoxy;
$R^6$ is alkyl of 1–4 carbons; phenethyl; cyclohexylmethyl; benzyl; benzyl mono- or disubstituted with alkyl of 1–4 carbons, alkoxy of 1–4 carbons, chlorine, bromine or alkoxycarbonyl of 2–5 carbons; aryl; or a group having the formula —$R^{11}$—$R^{17}$ in which $R^{11}$ is ethylene, propylene, trimethylene or tetramethylene and $R^{17}$ is alkanoyloxy of 2–5 carbons, cyano, alkoxy carbonyloxy of 2–5 carbons, arylcarbamoyloxy, alkylcarbamoyloxy of 2–5 carbons, aroyloxy, alkoxycarbonylbenzoyloxy of 1–4 carbons in the alkyl moiety alkoxy of 1-carbons, chlorine, aryloxy, 2-benzothiazolylthio, or a group having the formula

in which Y is —CO—, —SO$_2$— or —CH$_2$— and $R^{16}$ is ethylene, propylene, trimethylene or o-arylene; and $R^7$ is alkyl of 1–4 carbons; cyclohexyl; alkylcyclohexyl of 1–4 carbons in the alkyl moiety; benzyl; benzyl mono- or disubstituted with alkyl of 1–4 carbons, alkoxy of 1–4 carbons, chlorine or bromine; aryl; or a group having the formula —$R^{11}$—$R^{17}$ in which $R^{11}$ is ethylene, propylene, trimethylene or tetramethylene and $R^{17}$ is alkanoyloxy of 2–5 carbons, alkoxycarbonyloxy of 2–5 carbons, aroyloxy or alkoxy of 1–4 carbons;

in which the aryl moiety of each aryl, aroyloxy, aryloxy and arylene group is phenyl, tolyl, alkoxyphenyl of 1–4 carbons in the alkyl moiety, or chlorophenyl.

6. A process according to claim 5 in which the anhydrous solution of the intermediate compound is added to a solutionslurry of the active methylene compound and the acid acceptor in a water-miscible solvent and the reaction mixture is maintained at a temperature of 20° to 80°C. until essentially all of the intermediate compound has reacted with the active methylene compound.

7. A process according to claim 6 in which the acid acceptor is sodium or potassium acetate, and the amount of acid acceptor used is at least 4 moles per mole of POCl$_3$ used in the synthesis of the intermediate compound, and the water-miscible solvent is a lower alkanol and in which the methine compound is precipitated by the addition of water to the reaction mixture, is isolated by filtration and is purified by washing with hot water.

8. A process according to claim 1 for the preparation of a disperse methine dye compound having the formula

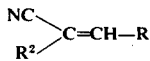

which comprises the steps of contacting at 0° to 125°C. an anhydrous solution of an intermediate compound, formed by contacting an amine having the formula H—R with POCl$_3$ and a di-alkylformamide of 1-4 carbons in the alkyl moiety, with an active methylene compound having the formula NC—CH$_2$—R$^2$ in the presence of at least three to four mole equivalents of an acid acceptor per mole of POCl$_3$ used in the synthesis of the intermediate compound, wherein R is a monovalent residue of a 1,2,3,4,-tetrahydroquinoline component of a disperse methine dye compound; and R$^2$ is cyano, alkoxycarbonyl of 2-5 carbons, alkanoyl of 1-4 carbons, phenyl carbonyl or phenyl carbonyl mono- or disubstituted with alkyl of 1-4 carbons, alkoxy of 1-4 carbons, Cl or Br, alkylsulfonyl of 1-4 carbons, phenylsulfonyl or phenylsulfonyl mono- or disubstituted with alkyl of 1-4 carbons, alkoxy of 1-4 carbons, Cl or Br, carbamoyl, N-alkylcarbamoyl or N,N-di-alkylcarbamoyl of 1-4 carbons in the alkyl moiety.

9. A process according to claim 1 for the preparation of a disperse methine dye compound having the formula

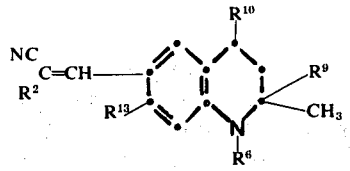

which comprises the steps of contacting at 10° to 80°C. an anhydrous solution of an intermediate compound, formed by contacting an amine having the formula

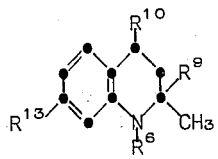

with POCl$_3$ and dimethylformamide, with an active methylene compound having the formula NC—CH$_2$—R$^2$ in the presence of at least three to four mole equivalents of an acid acceptor per mole of POCl$_3$ used in the synthesis of the intermediate compound, wherein R$^2$ is cyano or alkoxycarbonyl of 2-5 carbons;

R$^{13}$ is hydrogen, methyl, methoxy, ethoxy or chlorine;

R$^6$ is alkyl of 1-4 carbons, phenethyl; cyclohexylmethyl; benzyl; benzyl mono- or disubstituted with alkyl of 1-4 carbons. alkoxy of 1-4 carbons, chlorine, bromine or alkoxycarbonyl of 2-5 carbons; aryl; or a group having the formula —R$^{11}$—R$^{15}$ in which R$^{11}$ is ethylene, propylene, trimethylene or tetramethylene and R$^{15}$ is alkanoyloxy of 2-5 carbons, cyano, alkoxycarbonyloxy of 2-5 carbons, arylcarbamoyloxy, alkylcarbamoyloxy of 2-5 carbons, aroyloxy, alkoxycarbonylbenzoyloxy of 1-4 carbons in the alkyl moiety, alkoxy of 1-4 carbons, chlorine, aryloxy, 2-benzothiazolylthio, or a group having the formula

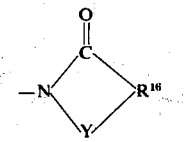

in which Y is —CO—, —SO$_2$— or —CH$_2$— and R$^{16}$ is ethylene, propylene, trimethylene or o-arylene; and R$^9$ and R$^{10}$ are hydrogen or methyl;

in which the aryl moiety of each aryl, aroyloxy, aryloxy and arylene group is phenyl, tolyl, lower alkoxyphenyl or chlorophenyl.

10. A process according to claim 9 in which the anhydrous solution of the intermediate compound is added to a solution-slurry of the active methylene compound and the acid acceptor in a water-miscible solvent and the reaction mixture is maintained at a temperature of 20° to 80°C. until the intermediate compound has reacted with the active methylene compound.

11. A process according to claim 10 in which the acid acceptor is sodium or potassium acetate, and the amount of acid acceptor used is at least four moles per mole of POCl$_3$ used in the synthesis of the intermediate compound, and the water-miscible solvent is a lower alkanol and in which the methine compound is precipitated by the addition of water to the reaction mixture, is isolated by filtration and is purified by washing with hot water.

12. A process according to claim 1 for the preparation of a disperse methine dye compound having the formula

which comprises the steps of contacting at 0° to 125°C. an anhydrous solution of an intermediate compound, formed by contacting an amine having the formula H—R$^1$—R$^1$—H with POCl$_3$ and a di-lower alkylformamide, with an active methylene compound having the formula NC—CH$_2$—R$^2$ in the presence of at least three to four mole equivalents of an acid acceptor per mole of POCl$_3$ used in the synthesis of the intermediate compound, wherein R$^1$ is a divalent residue of an aniline component of a disperse methine dye compound; and R$^2$ is cyano, alkoxycarbonyl of 2-5 carbons, alkanoyl of 2-5 carbons, phenyl carbonyl or phenyl carbonyl substituted with alkyl of 1-4 carbons, alkoxy of 1-4 carbons, Cl or Br, alkylsulfonyl of 1-5 carbons, arylsulfonyl, carbamoyl, N-alkylcarbamoyl or N,N-di-alkylcarbamoyl of 2-5 carbons;

in which each aryl moiety is phenyl or phenyl substituted with alkyl of 1-4 carbons, alkoxy of 1-4 carbons, or halogen.

13. A process according to claim 1 for the preparation of a disperse methine dye compound having the formula

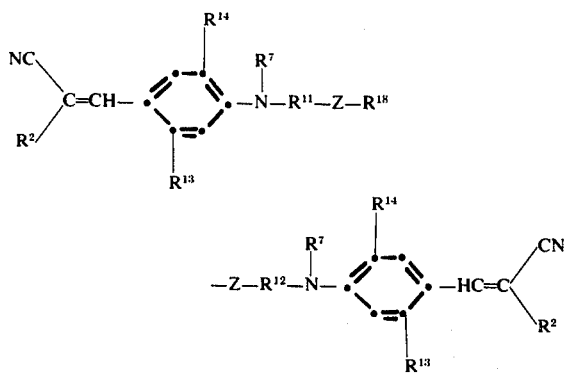

which comprises the steps of contacting at 10° to 80°C. an anhydrous solution of an intermediate compound, formed by contacting an amine having the formula

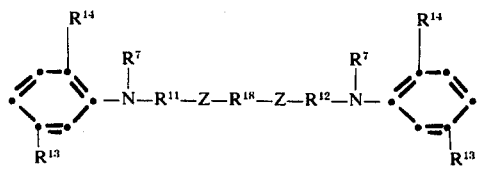

with $POCl_3$ and dimethylformamide, with an active methylene compound having the formula $NC-CH_2-R^2$ in the presence of at least three to four mole equivalents of an acid acceptor per mole of $POCl_3$ used in the synthesis of the intermediate compound, wherein $R^2$ is cyano or alkoxycarbonyl of 2–5 carbons;
$R^{13}$ is hydrogen, methyl, methoxy, ethoxy or chlorine;
$R^{14}$ is hydrogen, methyl, methoxy or ethoxy;
$R^7$ is alkyl of 1–4 carbons; cyclohexyl; alkylcyclohexyl of 1–4 carbons in the alkyl moiety; benzyl; benzyl substituted with alkyl of 1–4 carbons, alkoxy of 1–4 carbons, chlorine or bromine; aryl; or a group having the formula $-R^{11}-R^{17}$ in which $R^{11}$ is ethylene, propylene, trimethylene or tetramethylene and $R^{17}$ is alkanoyloxy of 2–5 carbons, alkoxycarbonyloxy of 2–5 carbons, aroyloxy or alkoxy of 1–4 carbons;
$R^{11}$ and $R^{12}$ are ethylene, propylene, trimethylene or tetramethylene;
Z is

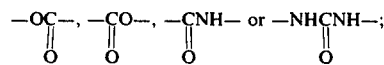

and
$R^{18}$ is alkylene of one to six carbon atoms, phenylene or phenylene substituted with methyl;
in which the aryl moiety of each aryl and aryloxy is phenyl, tolyl, alkoxyphenyl of 1–4 carbons in the alkyl moiety, or chlorophenyl.

14. A process according to claim 13 in which the anhydrous solution of the intermediate compound is added to a solution-slurry of the active methylene compound and the acid acceptor in a water-miscible solvent and the reaction mixture is maintained at a temperature of 20° to 80°C. until the intermediate compound has reacted with the active methylene compound.

15. A process according to claim 14 in which the acid acceptor is sodium or potassium acetate, and the amount of acid acceptor used is at least four moles per mole of $POCl_3$ used in the synthesis of the intermediate compound, and the water-miscible solvent is a lower alkanol and in which the methine compound is precipitated by the addition of water to the reaction mixture, is isolated by filtration and is purified by washing with hot water.

* * * * *

UNITED STATES PATENT OFFICE
CERTIFICATE OF CORRECTION

Patent No. 3,917,604  Dated November 4, 1975

Inventor(s) Vinton A. Hoyle, Jr.

It is certified that error appears in the above-identified patent and that said Letters Patent are hereby corrected as shown below:

Column 5, line 56, delete "comsumption" and insert therefor ---consumption---.

Column 9, line 1, after "alkyl of 1-4 carbons," insert ---alkoxy of 1-4 carbons,---.

Column 10, line 32, delete "1-carbons," and insert therefor ---1-4 carbons,---.

Column 10, line 61, delete "solutionslurry" and insert therefor ---solution-slurry---.

Column 11, lines 41-47, delete the formula and insert therefor

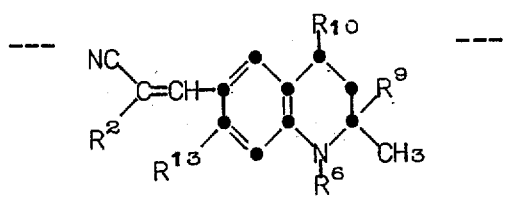

Signed and Sealed this seventeenth Day of February 1976

[SEAL]

Attest:

RUTH C. MASON
Attesting Officer

C. MARSHALL DANN
Commissioner of Patents and Trademarks